(12) United States Patent
Ohlsson

(10) Patent No.: US 7,191,595 B2
(45) Date of Patent: Mar. 20, 2007

(54) LUBRICATION DEVICE

(75) Inventor: Kjell Ohlsson, Stockamöllan (SE)

(73) Assignee: Volvo Wheel Loaders AB, Eskilstuna (SE)

( * ) Notice: Subject to any disclaimer, the term of this patent is extended or adjusted under 35 U.S.C. 154(b) by 0 days.

(21) Appl. No.: 10/709,864

(22) Filed: Jun. 2, 2004

(65) Prior Publication Data

US 2005/0223704 A1  Oct. 13, 2005

Related U.S. Application Data

(63) Continuation of application No. PCT/SE02/02185, filed on Nov. 27, 2002, now abandoned.

(30) Foreign Application Priority Data

Dec. 6, 2001 (SE) .................................... 0104121

(51) Int. Cl.
*F16N 7/00* (2006.01)

(52) U.S. Cl. ............................................ 60/456; 91/46
(58) Field of Classification Search .................. 60/456; 91/46; 92/153
See application file for complete search history.

(56) References Cited

FOREIGN PATENT DOCUMENTS

JP  2000-074292 A  3/2000
JP  2000074292 A  *  3/2000

\* cited by examiner

*Primary Examiner*—Thomas E. Lazo
(74) *Attorney, Agent, or Firm*—Novak Druce & Quigg, LLP

(57) ABSTRACT

Method and arrangement for providing a device for delivering lubricant (10a, 10b) to at least one lubrication point (17) and which includes a reservoir (9) for lubricant (10a, 10b) connected to the lubrication point (17) via a valve arrangement (16). The device includes a controller of the valve arrangement (16), depending on the pressure in an hydraulic circuit (26) connected to the device. The invention provides an improved device for the efficient delivery of lubricant to a lubrication point.

19 Claims, 2 Drawing Sheets

LUBRICATION DEVICE

CROSS-REFERENCE TO RELATED APPLICATIONS

The present application is a continuation patent application of International Application No. PCT/SE02/02185 filed 27 Nov. 2002 which was published in English pursuant to Article 21(2) of the Patent Cooperation Treaty, and which claims priority to Swedish Application No. 0104121-9 filed 6 Dec. 2001. Both applications are expressly incorporated herein by reference in their entireties.

The present invention relates to a device for delivering lubricant to at least one lubrication point, and that includes a lubricant reservoir connected to the lubrication point via a valve arrangement.

BACKGROUND ART

Hydraulic cylinders are used, for example, in vehicles and in particular in construction machines such as excavators, wheel loaders and waist-or chassis-steered vehicles. According to the invention, in a preferred embodiment, a wheel loader is provided with two load arms, and at least one hydraulic cylinder that is designed to raise or lower the load arms in relation to the vehicle. There is a need with such an hydraulic cylinder to be able to deliver lubricant easily and efficiently to bearings arranged at the bearing point of the hydraulic cylinder on the load arm and on the vehicle in order to reduce wear in the bearing.

The use of time-controlled devices for delivering lubricant to such bearings is known. Such a time-controlled device delivers a predetermined quantity of lubricant to a bearing with a certain time interval. The time between each lubrication pulse is adjusted in order to deliver the quantity of lubricant needed in order to minimize the risk of wear in the bearing under the normal working load of the hydraulic cylinder.

One disadvantage with such a device is that lubricant is delivered to the bearing at each predetermined lubrication pulse regardless of the actual need for lubricant.

This means that under a high working load in the hydraulic cylinder, an insufficient quantity of lubricant is delivered to the bearing in relation to the actual need, which can lead to problems of wear and tear in the bearing.

Furthermore, at low working load in the hydraulic cylinder an excessive quantity of lubricant is delivered in relation to the actual need, which leads to problems of excess lubricant in the bearing.

Another disadvantage with such a device is that since lubricant is delivered when the bearing is under load, the lubricant will not be distributed right around the bearing. This is the case, in particular, in bearings with a small angle of rotation since there is a risk that a part of the bearing will never receive a sufficient quantity of lubricant.

DISCLOSURE OF INVENTION

A primary object of the present invention is to provide an improved device for delivering lubricant to a bearing, in which the aforementioned problems are resolved. The invention comprises (includes, but is not limited to) a device for delivering lubricant to a lubrication point. A lubricant reservoir is connected to the lubrication point via a valve arrangement. The invention is characterized by the fact that the device comprises means designed to cyclically control the valve arrangement as a function of the pressure in a hydraulic circuit connected to the device, with a lubrication pulse being emitted each time. A pressure drop in the circuit follows what had previously been a sufficiently high pressure level.

The invention affords a number of advantages. First, it may be noted that a device according to the invention provides a lubrication device in which lubricant is delivered to a bearing in proportion to the working load in an hydraulic cylinder, and hence also to the actual need of the bearing. This results first and foremost in a reduced risk of damage, but also in a reduced need for servicing and maintenance which in turn leads to more reliable operation, lower costs and increased productivity. The fact that the lubrication device is controlled as a function of the pressure in a hydraulic circuit connected to the device and to the hydraulic cylinder provides a solution which also means that timed control, by means of a timer, for example, is not required.

In a bearing, the tolerances are never less than a certain ever-present degree of play.

If the bearing is placed under load, the bearing closes more tightly on one side and consequently a degree of play occurs on the other side. This means that when lubricant is delivered while the bearing is under load, penetration is difficult on the side that is under load where the bearing closes more tightly. Further, a greater part of the lubricant therefore collects on the other side of the bearing; that is to say, on the side least subject to wear, and therefore least in need of lubrication. The fact that the solutions (devices) according to the present invention deliver lubricant when the bearing is not under load means that the lubricant will be more readily distributed evenly throughout the bearing. This is particularly advantageous in the case of highly stressed bearings having a small angle of rotation.

Further advantages and objects of the invention can be inferred from the patent claims below and from the following description.

BRIEF DESCRIPTION OF THE DRAWINGS

The invention is explained in more detail below with reference to a preferred exemplary embodiment and to the included drawings, in which.

MODE FOR THE INVENTION

Figure 1:
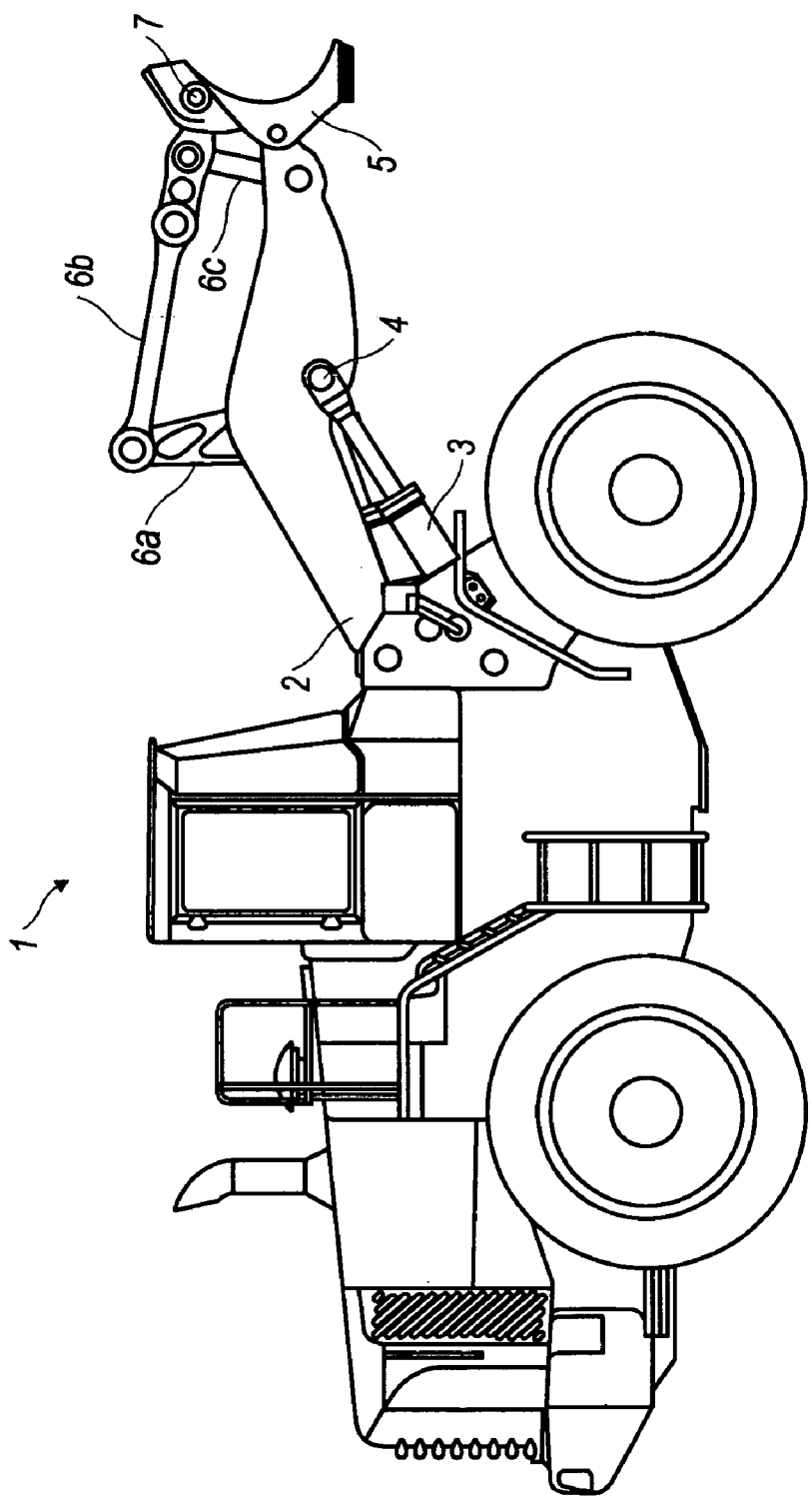
FIG. 1 is a side view of an including wheel loader.

FIG. 1 shows a side view of a wheel loader 1 in which the invention can be used.

The wheel loader 1 is provided with an articulated arm system which comprises two parallel load arms (of which only one load arm 2 can be seen from the side view of FIG. 1) and two hydraulic cylinders (of which only one hydraulic cylinder 3 is shown in FIG. 1). The hydraulic cylinders 3 are designed to raise and/or lower the load arms 2 in relation to the wheel loader 1. The hydraulic cylinder 3 has two bearing points, one bearing point 4 on the load arm 2 and one bearing point (obscured in FIG. 1) on the vehicle 1. The articulated arm system further comprises an implement 5 pivoted at the outer ends of the load arms 2, such as a pallet fork or bucket, together with articulated arms 6a, 6b, 6c connected to an upper joint axis 7 of the implement 5 for operation thereof.

Figure 2:
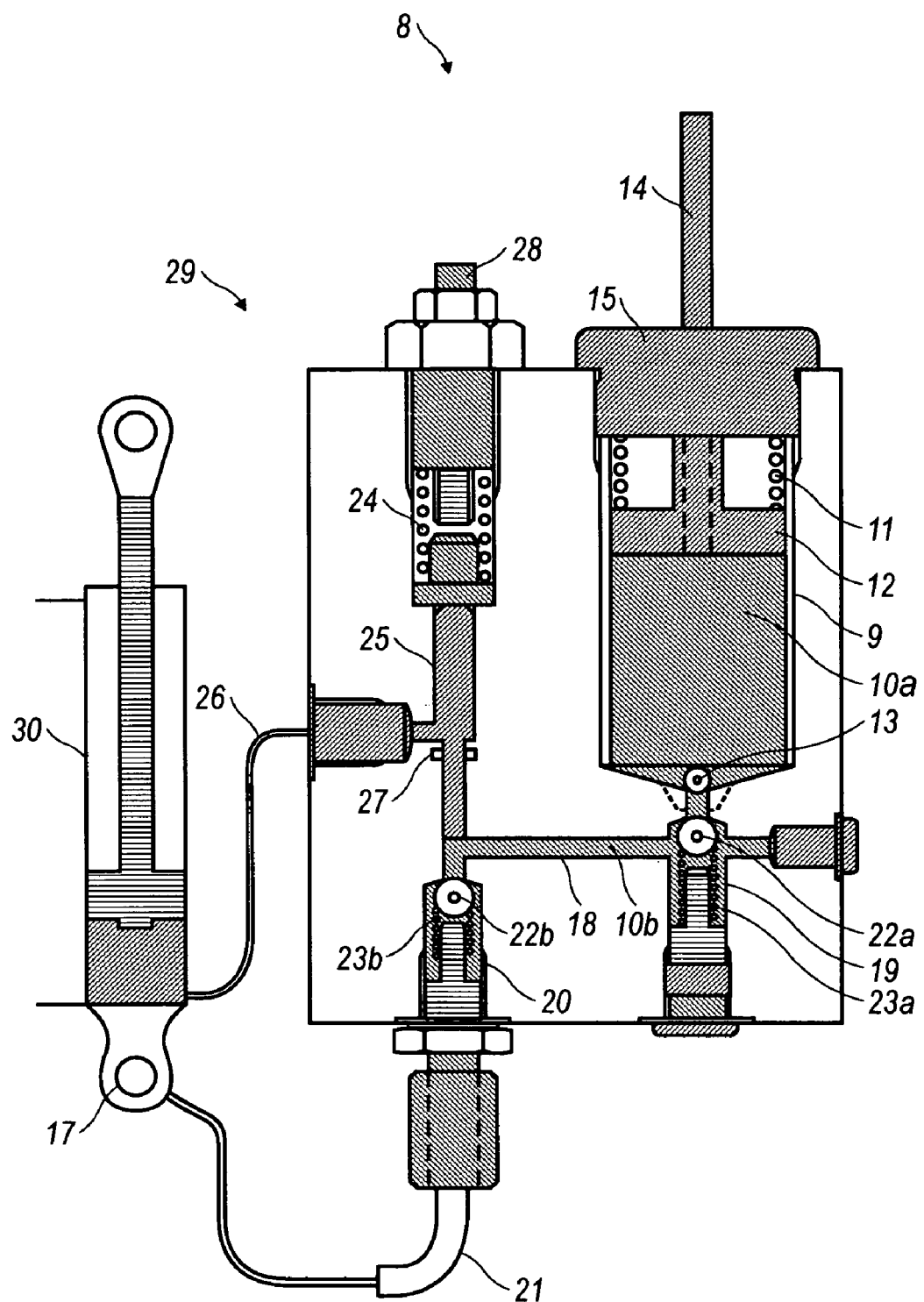
FIG. 2 is a schematic view of an hydraulic connection configured according to the teachings of the present invention.

FIG. 2 shows a schematic connection diagram 8 of a preferred embodiment of the invention in which a reservoir 9 for lubricant 10a is firmly mounted in the vehicle 1.

The reservoir 9 comprises a piston loaded by a spring 11, hereinafter called a pump piston 12, fitted inside the reservoir 9. The pump piston 12 is designed to be capable of moving in two opposite directions in the reservoir 9, upward and downward in FIG. 2, and in the case of downward movement, to exert pressure on the lubricant 10a stored in the reservoir 9. The reservoir 9 is topped up by a lubricant gun (not shown) via a nipple 13 fitted to the reservoir 9.

A dipstick 14 is arranged in the pump piston 12 in order to make it easier to read off the quantity of lubricant 10a in the reservoir 9. The dipstick 14 is arranged in such a way that one end thereof is fixed to the pump piston 12 and the other end thereof extends outside the reservoir 9. The dipstick 14 is at the same time designed, though a cover 15 fitted to the top of the reservoir 9, to follow the movement of the pump piston 12 in the reservoir 9 and allows the quantity of lubricant 10a in the reservoir 9 to be read off. The reservoir 10 is connected by way of a valve arrangement 16 to a bearing 17. The valve arrangement 16 comprises a chamber 18 connected to the mouth of the reservoir 9 together with a first non-return valve 19 and a second non-return valve 20 in order to produce a one-way flow of lubricant 10a, 10b from the reservoir 9 through the chamber 18 to the bearing 17. The first non-return valve 19 is fitted adjacent to the outlet of the reservoir 9 and permits a flow of lubricant 10a, 10b from the reservoir 9 to the chamber 18. The second non-return valve 20 is fitted at the inlet to a delivery duct 21 connected to the bearing 17 and permits a flow of lubricant 10b from the chamber 18 to the bearing 17.

The non-return valves 19, 20 comprise a ball 22a, 22b, which by means of a spring 23a, 23b, is pressed against a seat so that lubricant 10a, 10b, can flow past the ball 22a, 22b, while the spring 23a, 23b, is compressed.

A piston, hereinafter called a control piston 25, loaded by an elastic element in the form of a spring 24, is arranged at the chamber 18 in order to control the valve arrangement 16. The control piston 25 is designed, under the influence of a hydraulic circuit 26 connected to the control piston 25, to be capable of moving in two opposite directions in the chamber 18, upward and downward according to FIG. 2, and in the case of a downward movement, to exert pressure on the lubricant 10b enclosed in the chamber 18. The downward movement of the control piston 25 is limited by a seal 27, acting as a stop shoulder that is arranged in the chamber 18. The upward movement of the control piston 25 in opposition to the spring 24 is limited by a stop screw 28. By adjusting the position of the stop screw 28, it is possible to define the stroke of the control piston 25 and hence the quantity of lubricant 10b which the bearing 17 receives at each lubrication pulse. The function in the form of a lubrication cycle in a lubrication device 10a, 10b according to the invention will be described in more detail below with reference to FIG. 2.

When an hydraulic pump (not shown) causes the pressure in the hydraulic circuit 26 to rise from a lower to a higher pressure, the control piston 25 moves toward the stop screw 28 under action of the spring 24. This means that the volume in the chamber 18 increases, which in turn causes the pressure therein to fall. When the pressure in the chamber 18 is lower than the pressure in the reservoir 9, the first non-return valve 19 opens and lubricant 10a is forced into the chamber 18. The second non-return valve 20 is loaded by a spring 23b, the spring constant of which is selected so that the non-return valve 20 is kept closed against the chamber 18.

When the pressure in the hydraulic circuit 26 then falls to a lower level, the control piston 25 is pressed back to its basic position against the seal 27 by the spring 24. This means that the pressure in the chamber 18 increases, which in turn means that the first non-return valve 19 is closed and the second non-return valve 20 is opened, and lubricant 10b is forced through the second non-return valve 20 and out to the bearing 17 via the delivery duct 21.

One lubrication cycle is thereby completed and the next one occurs when pressure falls following a pressure rise in the hydraulic circuit 26 sufficient to compress the spring 24 acting in opposition to the control piston 25.

The invention is not confined to the exemplary embodiment described above and shown in the drawings, but can be freely modified within the scope of the patent claims. For example, the invention is not limited to use on wheel loaders, but can be used on all types of vehicle in which hydraulic cylinders are used.

The invention can also be used for delivering lubricant to lubrication points other than the bearing points on the hydraulic cylinders. For example, lubricant can be delivered to bearing points of the articulated arms on the load arms.

According to the exemplary embodiment above, the second non-return valve is opened by the lubricant when the pressure in the chamber exceeds a specific value.

In another embodiment of the invention, the elastic element may alternatively be designed to open the valve directly, for example mechanically by way of a linkage system. As an alternative to a helical coil spring, the elastic element may take the form of other elements, such as a body of an elastic material, for example, which yields for pressure loading and returns to its original shape once the pressure is removed.

In another embodiment of the invention, the housing from a common grease gun is used together with associated grease cartridges in place of a lubricant reservoir.

In yet another embodiment, the reservoir is topped up via a centrally located lubricant stock coupled to the reservoir. The term reservoir must be interpreted in context and encompasses various types of arrangements in which a cavity is at least partially enclosed by a number of walls. For example, a tube or a conduit or a part thereof must also be included.

The invention claimed is:

1. A device for delivering lubricant to at least one lubrication point (17), said device comprising: a reservoir (9) for lubricant (10a) connected to the lubrication point (17) and control means (30) for controlling the delivery of lubricant to the lubrication point (17) depending on the pressure in a hydraulic circuit (26) connected to said device wherein a lubrication pulse is emitted when the pressure in the hydraulic circuit drops relative to a previously sufficiently high pressure level.

2. The device as recited in claim 1, wherein said control means (30) further comprises an elastic element (24) configured to be compressed in the event of a pressure increase and to expand in the event of a pressure drop in the hydraulic circuit (26), and said elastic element (24) being arranged, in the event of a pressure drop, to bring about the delivery of lubricant to the lubrication point (17).

3. The device as recited in claim 2, further comprising: an hydraulically loaded piston (25) connected to the hydraulic circuit (26) and arranged to act upon the elastic element (24) in the event of a hydraulic pressure variation.

4. The device as recited in claim 3, wherein movement of the hydraulically loaded piston (25) in one direction is limited by a stop shoulder (27).

5. The device as recited in claim 1, further comprising: a valve arrangement (16) connected between the reservoir (9) and the lubrication point (17) for controlling the delivery of lubricant.

6. The device as recited in claim 5, wherein the elastic element (24) is arranged to open a second valve (20) forming part of the valve arrangement in the event of a pressure drop.

7. The device as recited in claim 5, wherein the valve arrangement (16) further comprises a chamber (18) connected to the reservoir (9) configured for containing lubricant (10a) and flow-control means (19, 20) for producing a one-way flow of lubricant (10a, 10b) through said chamber (18).

8. The device as recited in claim 7, wherein said flow-control means (19,20) further comprises: a first non-return valve (19) connected to the reservoir (9); a second valve (20) in the form of a non-return valve arranged at an inlet to a duct (21) connected to the lubrication point (17); and said chamber (18) being arranged between said first non-return valve (19) and said second non-return valve (20).

9. The device as recited in claim 1, further comprising: delivery control means (28) for controlling the quantity of lubricant delivered to the lubrication point (17) in a lubrication cycle.

10. The device as recited in claim 1, further comprising: a display means for displaying the level of lubricant (10a) in the reservoir (9) is located on a pump piston (12) arranged in the reservoir.

11. The device as recited in claim 10, wherein said display means further comprises a dipstick (14) fixed to the pump piston and configured to follow the movement of the pump piston (12).

12. The device as recited in claim 10, wherein said reservoir (9) for lubricant (10a) is topped up via a nipple (13) fitted to the reservoir (9).

13. The device as recited in claim 10, wherein said hydraulic circuit (26) is connected to a hydraulic cylinder (30) and that the lubrication point consists of a bearing (17) arranged at the bearing point (4) of the hydraulic cylinder (30).

14. A method for automated delivery of lubricant to a pivot connection between a hydraulic piston-cylinder arrangement and an incorporating piece of construction equipment, said method comprising: automatedly delivering lubricant (10a) from a lubricant reservoir (9) to the pivot connection between the piston-cylinder arrangement and the incorporating piece of construction equipment based on a drop in pressure in the piston-cylinder arrangement relative to a previously sufficiently high pressure level.

15. The method as recited in claim 14, further comprising: delivering lubricant (10a) from a lubricant reservoir (9) to the pivot connection based upon detection of a predetermined duty cycle of the piston-cylinder arrangement.

16. The method as recited in claim 15, wherein said predetermined duty cycle of the piston-cylinder arrangement includes a plurality of hydraulically actuated extensions and retractions of the piston-cylinder arrangement.

17. The method as recited in claim 16, wherein said detection of a predetermined duty cycle of the piston-cylinder arrangement is based on sensed hydraulic pressure changes in the piston-cylinder arrangement.

18. The method as recited in claim 14, further comprising: delivering lubricant (10a) from a lubricant reservoir (9) to the pivot connection based upon pressure-pulse detection in the piston-cylinder arrangement representative of an extension-contraction cycle of the piston-cylinder arrangement.

19. The method as recited in claim 14, further comprising: controlling the delivery of lubricant to the pivot connection to times when balanced distribution of lubrication is facilitated based on the relative orientation existing between the piston-cylinder arrangement and the incorporating piece of construction equipment.

* * * * *